(12) United States Patent
Bank et al.

(10) Patent No.: US 12,157,235 B2
(45) Date of Patent: Dec. 3, 2024

(54) METHOD FOR DYNAMIC MULTI-DIMENSIONAL SPATIO-TEMPORAL HUMAN MACHINE INTERACTION AND FEEDBACK

(71) Applicant: Siemens Aktiengesellschaft, Munich (DE)

(72) Inventors: Hasan Sinan Bank, Sacramento, CA (US); Michael Little, Hillsborough, NJ (US)

(73) Assignee: Siemens Aktiengesellschaft, Munich (DE)

( * ) Notice: Subject to any disclaimer, the term of this patent is extended or adjusted under 35 U.S.C. 154(b) by 343 days.

(21) Appl. No.: 17/606,535

(22) PCT Filed: May 31, 2019

(86) PCT No.: PCT/US2019/034784
§ 371 (c)(1),
(2) Date: Oct. 26, 2021

(87) PCT Pub. No.: WO2020/242487
PCT Pub. Date: Dec. 3, 2020

(65) Prior Publication Data
US 2022/0203540 A1    Jun. 30, 2022

(51) Int. Cl.
*B25J 9/16*    (2006.01)
*B25J 13/00*    (2006.01)
(Continued)

(52) U.S. Cl.
CPC .......... *B25J 9/1676* (2013.01); *B25J 9/1661* (2013.01); *B25J 9/1697* (2013.01); *B25J 13/003* (2013.01);
(Continued)

(58) Field of Classification Search
CPC ...... B25J 9/1676; B25J 9/1661; B25J 9/1697; B25J 13/003; B25J 13/084; G05B 19/4061; G05B 2219/40202
See application file for complete search history.

(56) References Cited

U.S. PATENT DOCUMENTS

| 9,283,678 | B2 | 3/2016 | Kuffner, Jr. et al. |
| 9,744,672 | B2 | 8/2017 | Coovert |

(Continued)

OTHER PUBLICATIONS

PCT International Search Report for corresponding PCT/US2019/034784 filed on Feb. 11, 2019; 13 pages.

*Primary Examiner* — Jason Holloway

(57) ABSTRACT

A system for safe interaction between a human and an industrial machine includes a cyber-mechanical system. The cyber-mechanical system includes at least one industrial machine and a cyber-mechanical control system for processing inputs and producing control outputs for the at least one industrial machine; The system further includes a task planner configured to translate high level goals into scheduled tasks of the industrial machine. The system includes an interaction reasoner that identifies at least one interaction between the industrial machine and a human working in cooperation with the industrial machine. Output of the interaction reasoner is provided to an image generator that produces an interaction image. The interaction image represents information relating to one or more of the scheduled tasks of the industrial machine. An image projector associated with the industrial machine conveys information about the scheduled tasks of the associated industrial machine to the human.

11 Claims, 4 Drawing Sheets

(51) Int. Cl.
  *B25J 13/08* (2006.01)
  *G05B 19/4061* (2006.01)
(52) U.S. Cl.
  CPC ........ *B25J 13/084* (2013.01); *G05B 19/4061* (2013.01); *G05B 2219/40202* (2013.01)

(56) References Cited

U.S. PATENT DOCUMENTS

| | | | |
|---|---|---|---|
| 2011/0050878 A1* | 3/2011 | Wells | H04N 7/181 |
| | | | 348/86 |
| 2013/0345874 A1* | 12/2013 | Blumberg | B25J 9/1676 |
| | | | 901/47 |
| 2014/0316570 A1* | 10/2014 | Sun | G05D 1/0246 |
| | | | 700/250 |
| 2015/0042485 A1 | 2/2015 | Suessemilch et al. | |
| 2016/0016315 A1* | 1/2016 | Kuffner, Jr. | B25J 19/06 |
| | | | 901/49 |
| 2019/0344444 A1* | 11/2019 | Morra | B25J 9/1692 |

\* cited by examiner

METHOD FOR DYNAMIC MULTI-DIMENSIONAL SPATIO-TEMPORAL HUMAN MACHINE INTERACTION AND FEEDBACK

TECHNICAL FIELD

This application relates to manufacturing. More particularly, this application relates to automated manufacturing by machines interacting with humans.

BACKGROUND

Human workers may safely operate in proximity with automatic industrial (and non-industrial) machines largely due to the predictable behavior of the machine and physical safety perimeters. However, as autonomous industrial machines become more intelligent and capable, the behaviors of these autonomous machines become increasingly complex and less predictable. While interest in collaborative work environments involving humans and autonomous machine companions continues to grow, the ability to maintain safety during these interactions becomes increasingly difficult. Current systems address this problem by introducing some form of human proximity recognition into the machines and subsequently employ avoidance/safety algorithms to control the machine. However, this unilateral solution does nothing to inform the human co-worker with regard to the motion and current and future intent of the autonomous partner (e.g. the machine). This lack of a bi-directional flow of information frustrates effective cooperation. Further, uni-directional communication clouds the basis for proximal safety decisions made by the human causing decisions to be ambiguous and potentially hazardous. This problem is especially critical in environments where "intelligent" cyber-physical systems are employed, such as systems whose behaviors may appear erratic and unpredictable to all but the most skilled and/or knowledgeable observers. Reliable safety procedures are especially important in environments where human-machine interaction is expected or ongoing. Accordingly, new solutions that provide increased operations safety in an increasingly unpredictable and hazardous environment are desired.

SUMMARY

A system for safe interaction between a human and an industrial machine includes a cyber-mechanical system. The cyber-mechanical system includes at least one industrial machine and a cyber-mechanical control system for processing inputs and producing control outputs for the at least one industrial machine; The system further includes a task planner configured to translate high level goals into scheduled tasks of the industrial machine. The system includes an interaction reasoner that identifies at least one interaction between the industrial machine and a human working in cooperation with the industrial machine. The output of the interaction reasoner is provided to an image generator that produces an interaction image. The interaction image is representative of information relating to one or more of the scheduled tasks of the industrial machine. An image projector associated with the industrial machine conveys information about the scheduled tasks of the associated industrial machine to the human. This arrangement provides increased awareness for the human participant and communicates the actions of the machine allowing for increased psychological well-being of a human participant working alongside an industrial machine. The interaction embodies information relating to a human-machine interaction in one of a plurality of domains. For example, the output domain may be a visual domain, an audible domain or a haptic domain. In addition, the interaction image may be mapped to the temperature domain. The interaction image may contain encoded information relating to the information of the human-machine interaction.

The system may further include a programmable output detector configured to detect the interaction image and decode the encoded information. Based on the decoded information, the programmable output detector generates a message based on the decoded information. The message is transmitted on a computer network for communication to the human participant.

According to some embodiments include a method for bi-directional communication in an interaction between a human and autonomous machine participant that includes defining a high level goal to be achieved, defining a plurality of tasks to be performed by the human participant or the autonomous machine participant, receiving state information from an environment of the interaction and identifying an interaction between the human participant and the autonomous machine participant, generating an interaction image based on the state information and the defined tasks, and displaying the interaction image to the human participant, the interaction image being indicative of a position of the autonomous machine participant. The interaction image and the foreshadowing image may be displayed simultaneously and represent the interaction according to an associated output domain. The output domain may include visual, audio, and/or haptic by way of non-limiting example, other domains may be contemplated that may be used as an output domain for interaction images. The interaction image may be automatically detected by a programmable output detector which generates a message in the programmable output detector based on the detected interaction image a communicates the message by the programmable output detector to the human participant. The message may be communicated to the human participant by communicating the message to a wearable device worn by the human participant. In some embodiments the presence and identity of a human participant may be detected. In some cases, the message generated by the programmable output detector may be customized for the location and/or identification of the human participant.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Figure 1:
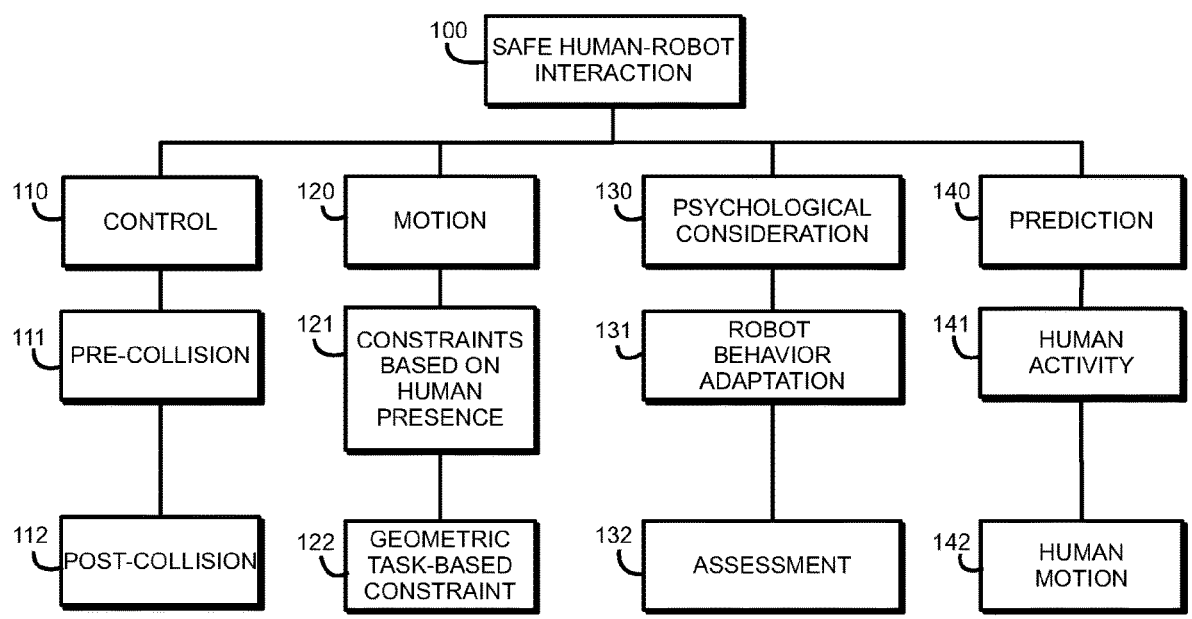
FIG. 1 is a block diagram of a conventional approach to human-robot interaction.

Conventional solutions for providing safety for human workers in automated industrial environments have traditionally relied on detecting the presence of the human and communicating the location and presence of the human to the mechanism that controls an industrial machine (e.g., a robot). Control of the machine is exercised to adapt the operation of the machine as to maximize safety of the human worker. For instance, when a human is detected the machine may receive an instruction or command to pause operation or to slow the operating speed of the machine allowing the human to be more reactive to the machine based on sensory indicators including sight or hearing. However, this requires the human to be reactive to actions of the machine as they occur in real time and does not provide the human with information relating to the intended operation of the machine either presently or in the future. The systems and methods described herein address the need to convey dynamically altering temporal-spatial machine operation information in multiple dimensions to workers and visitors in the presence of and/or in close proximity to cyber-physical operational spaces characterized by safety and hazard conditions that vary across space and time. Embodiments herein provide means to facilitate cooperative human machine interaction by enabling humans and intelligent industrial machines to operate safely in close proximity to one another while performing tasks.

Conveyance of information regarding safety and hazard conditions in cyber-physical systems has its roots in the industrial age proliferation of mechanical devices deployed in close proximity to humans. This is illustrated by textile mills of that time and is found essentially in all industries that pursued mass adoption of mechanical devices for labor enhancement. One popular approach to this problem is to determine the extent of physical space necessary to physically separate the human from the machine and to mark and/or physically impede occupancy of identified safe space. Techniques for spatial constraints to enforce safe interaction include physically located boundary markers (e.g., signs, tape on the floor) and obstacles (e.g., fence, roped off area). The deficiency of these approaches becomes apparent when considering machine operations that vary across space and time. This type of operation is increasingly the case as the use of autonomous machines increases. Autonomous machines make decisions and implement operational states in a dynamic fashion, based on ever-changing states of the environment. If the machine moves, the safety markers and obstacles need to be reestablished. One solution to this is to attach these markers and obstacles to the machine, which while effective for close proximity conveyance becomes impractical where conveyance further from the machine is required. If the machine operates differently under differing circumstances (e.g., configuration per task) permanent markers and obstacles either need to circumscribe all possibilities (e.g., a large spatial margin) or alternatively be re-established for each circumstance. One approach to dealing with variance over time is to employ visual or audible conveyances. Examples of such conveyances include flashing/rotating lights and/or claxon/siren activation. While these mechanisms heighten awareness, they perform very poorly with regard to conveying location specificity. Mounting devices on moving machinery allows the conveyance to be relative to the machine location (e.g., audible truck backup signal) but does not address the need for the level of precision required by close working relationships.

Another related approach to safe human-robot interactions is to improve the awareness of the cyber-physical system to the presence of the human. A wide variety of proximity detectors exist (e.g., passive and active radiative energy detection systems, weight sensing floor mats) and these detectors act as a trigger to the conveyance mechanism if one exists, and/or to the operation of the machine such as halting operation if a human is detected in close proximity. However, this approach has limited effectiveness because it is unilateral and sequential. This approach is unilateral because the machine is informed of the presence of the human, but the human is not informed of the current or future position of the machine. It is sequential in that it becomes the responsibility of the machine to inform the human only after the machine itself has been informed.

Conventional techniques employ proximity notification to the machine regarding the presence of a human. These techniques include explicit proactive human-to-machine notification such as when the human physically interacts with a machine control interface with the machine, trigger mechanisms such as opening a gate or tripping a light beam, and continuously monitoring sensors such as motion or infra-red detectors in communication with a machine employing a bi-modal operational protocol. The bi-modal operational protocol includes one operational mode that is employed when human proximity is detected and a second operational mode that is employed when humans presence is not detected. The latter mode utilizes operational constraints with regard to range and rate of motion. In contrast, the former mode is a constrained operational mode that is considered a safe mode of operation when humans are nearby. For instance, the human present protocol may restrict side-to-side motion and motion tempo to one-tenth (or less) than "normal" (no human presence) motion range and speed by way of non-limiting example.

FIG. 1 is a block diagram illustrating a systematic grouping illustrating current research in human-robot-interaction. Currently known techniques may be broken down into four main categories: low level control 110, motion planning 120, psychological considerations 130 and prediction 140.

Low-level real-time control 110 may be designed to achieve safe and reliable human-robot interaction through low-level control of the robot's actions. Control of the range of motion and speed of the robot may be utilized to increase safety of interactions with human workers. This control may be based on the detection of a human in the proximity of the robot and occur pre-collision 111. For example, when it is detected that a human has entered the operating area of the robot, the speed of the robot may be reduced. This allows the human to more easily perceive the motion and position of the robot as it operates. For post-collision control 112, the robot may be controlled after contact with the human, such as shutting down the robot after the collision is detected. Low level control 110 is often the simplest method of enabling safe human-robot coexistence, as it does not require complex prediction models or planners.

Planning of motion or tasks 120 may provide safety via real-time control and is necessary to avoid undesirable collisions between humans and robots. However, without the planning approach, efficient team fluency between the human and machine is not possible as evidenced through quantitative metrics such as task execution time and duration of concurrent motion. Motion control 120 may include the establishing of constraints for the machine based on detected human presence 121. For example, the range of motion for the robot itself or parts such as an arm or gripper may be constrained based on the detection of a human presence. Similarly, geometric constraints 122 may be imposed on the machine by defining spatial areas designated as safe zones, meaning the tasks and motion of the robot are assigned such that the robot never enters the defined spatial areas. Carefully planned tasks and motions may also contribute to greater satisfaction of the human by allowing the perception of the robot as a teammate and providing higher perceived levels of safety and comfort between participants.

Psychological considerations 130 involve the human's perception of the interaction between the human and the machine, and how the human feels with regard to safety and job satisfaction in view of the perceived interactions. Preserving physical safety is one of the most important factors in human-robot interaction (HRI). However, ensuring a sense of psychological well-being is also of critical importance. Preserving psychological safety involves ensuring that the human perceives interaction with the robot as safe and that interaction does not lead to any psychological discomfort or stress as a result of the robot's motion, appearance, embodiment, gaze, speech, posture, social conduct, or any other attribute. Results from prior experiments have indicated that maintaining physical safety by simply preventing collisions as they are about to occur can lead to low levels of perceived safety and comfort among humans. Therefore, maintenance of physical safety alone cannot ensure safe and reliable HRI. Techniques for addressing psychological considerations 130 include the adaptation of robot behavior 131 so that is instills confidence and comfort in human perception. Further, techniques for assessment 132 of which types of robot actions provide the most comfortable experience may be performed to feed the decision process in robot behavior adaptation 131.

Prediction 140 involves the ability to forecast future actions or states based on observed states in the present as well as historical data that occurred in the past. Conventional techniques in predictive analysis assumes that the environment is quasi-static. These techniques simply rely on revising planned motions when the movement of human and robotic agents conflict concerning a pre-determined plan. The pre-determined plan defines human activities 141 to be performed and identify human motions 142 associated with the planned human activities 141. However, the quasi-static approach is insufficient for preserving safety in dynamic environments such as environments containing autonomous or partially autonomous machines. In fact, motion plans based on a quasi-static assumption quickly become obsolete, making reliance on evaluation impractical. This is especially true if the team works in proximity to one another as there may not be sufficient time to re-plan. Consequently, the ability to anticipate the actions and movements of members of a human-robot team is crucial for providing safety within dynamic HRI environments.

In a comprehensive solution, the categories described above may be implemented as combinations for example low-level control may be combined with planning; low-level control, planning, and predictions, other possible combinations are also available. However, while the categorization of these techniques points represents advancements in low-level controlling, planning, psychological, and predictive aspects a challenge to safe human-machine interaction remains as the bidirectional flow of information (e.g., from the machine to the human) is virtually non-exist or at least insufficient.

Collaboration is inherently a two-way interaction. Accordingly, the human agent's ability to predict the actions and movements of a robot is as essential as the ability of robots to anticipate actions of humans. Methods according to embodiments of this disclosure propose to project the actions and intents of the robots or machines to their corresponding human companions utilizing output forms that can be captured and perceived by humans. Potential output forms include but are not limited to sound, visual, touch, haptic and the like. These output are embodied as projections and for the purpose of this disclosure are identified as "images." That is, images may be segmented and classified by a specific output domain for practical purposes (e.g., visual, audio, haptic) relating to the image, but the term image is used to refer to any output form that belongs to any possible output domain either individually or inclusively. The improvement to the current state of the art, which only concentrated on directing information from the human action to the machine, is achieved recognizing the importance of human perception regarding the intuitiveness of the robot's actions providing bi-directional information flow including directing information of human actions to the machine, and also directing information of machine actions to the human. This eases decision making for humans and allows efficient, fluent, and safe human-robot team interactions. To do this, particular attention is given to factors that improve the information flow from a unidirectional paradigm to a bi-directional one.

Figure 2:
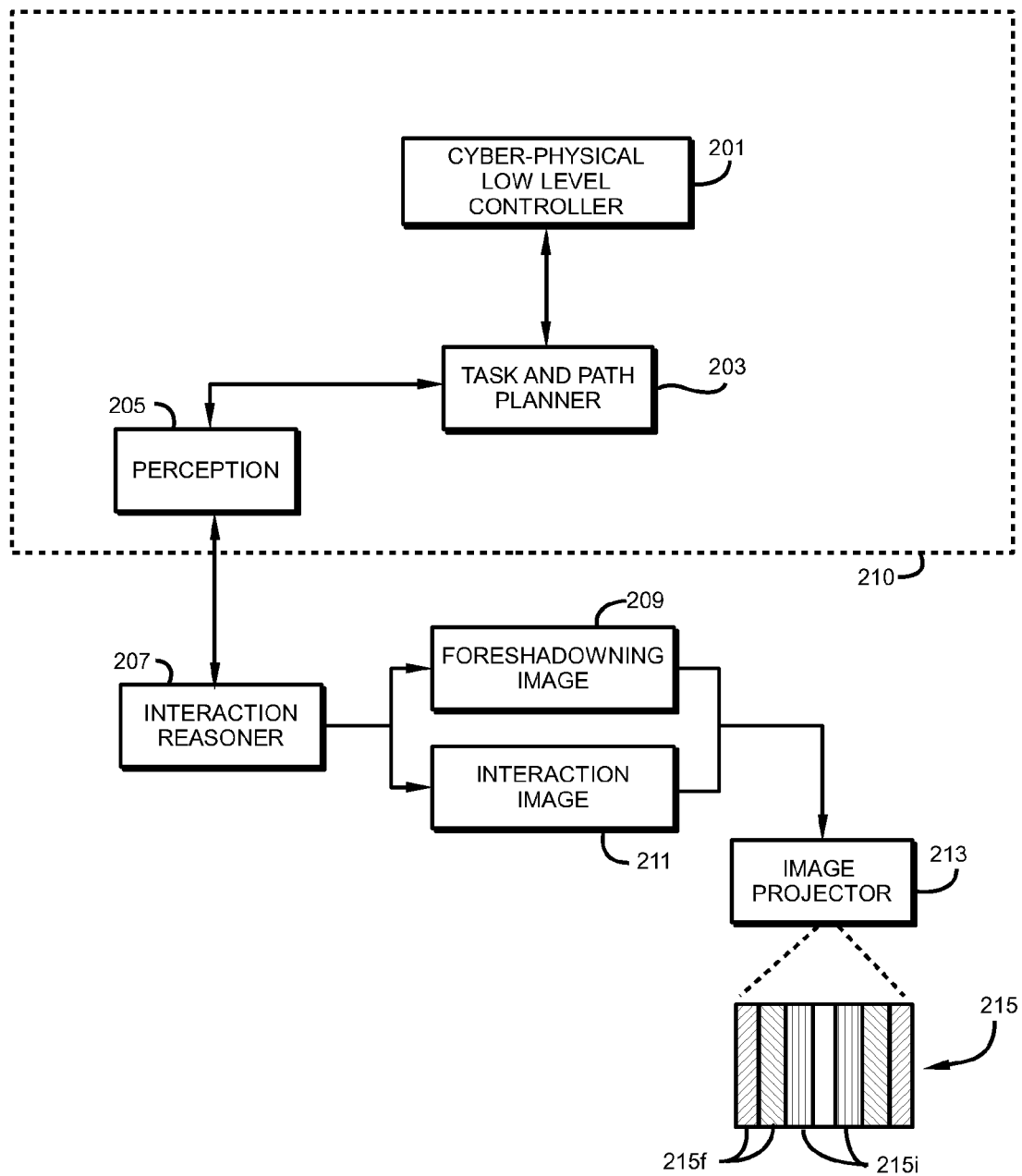
FIG. 2 is a block diagram of a system for providing bi-directional human-robot interaction according to aspects of embodiments of the present disclosure.

FIG. 2 is a block diagram of a system for human machine interaction according to aspects of embodiments of this disclosure. The system comprises a cyber-physical system 210, cyber-physical system controller 201, a task planner 203, a perception module 205, an interaction reasoner 207, an interaction image 211, a foreshadowing image 209, and an image projector 215.

The cyber-physical system 210 is the physical manifestation of a machine and its constituent cybernetic components that interact with one or more humans to accomplish specific goals and tasks. From the perspective of the cyber-physical participant (e.g. the machine), interaction with a human occurs in the digital domain, where inputs and actions by the machine are easily preserved. However, when considering human interactions, the stimuli and resulting actions performed by the human participant are hard to preserve. Embodiments described herein facilitate communication between the machine and human in a bi-directional manner.

A cyber-physical low-level controller 201 ensures the proper execution of the path and task plans provided by the path and task planner 203 guiding the activities of cyber-physical system 210. A cyber-physical low-level controller 201 may be any controller that is configured to adjust control signals in a way that tracks or follows the given commands. Some well-known controllers include but are not limited to proportional integral derivative (PID), pole placement, linear quadratic regulator (LQR), linear quadratic gaussian (LQG), bang-bang, model predictive control (MPC), and the like.

The task and path planner 203 perform one or more of a list of algorithms that translate high-level goals/objectives into scheduled tasks for individual cyber-physical system units. Route planners break down the high-level tasks into more executable formats, such as incorporating spatial coordinates of future positions and orientations. In some embodiments the path planning algorithms will utilize obstacle avoidance, feed-rate schedule, and/or other kino-dynamic features.

The interaction reasoner 207 is configured to receive inputs relating to the representing states of the environment including outputs from the task and path planner 203. The environment includes one or more human and machine participants. The inputs are processed to consider context of interactions that occur between each machine with respect to one or more human participants. Inputs may include information corresponding to the one or more human participants such as information received from a perception 205 mechanism like a sensor, information relating to the one or more machines including position and information relating to goals and tasks required to complete the goal, and information relating to the environment. Additional data relating to the interaction may be also received by the interaction reasoner 207 from other sources.

Input relating to human participants may include information corresponding to detection of a presence of the human within the work area via perception process 205. For example, the proximity of a human may be detected through explicit information, such as a human interacting with a human machine interface (HMI), where a graphical user interface GUI providing control for the machine is presented to a human operator. By operating controls via the GUI in the HMI, the presence of the human at the HMI may be ascertained. In some embodiments, human presence may be detected through sensors placed throughout the workspace. Sensors may be passive or active, including sensors that measure radiative energy, such as infrared or radio frequency motion sensors. Other presence detection devices may include weight sensing floor mats, or switches associated with gates or doors in close proximity to the interaction space. In some embodiments, cameras may be employed to monitor the workspace and capture image and video information. Captured information may be analyzed to recognize the presence of humans in the workspace. When a human presence is detected or conversely if it is determined that there is no human presence, this information is provided to the interaction processor 207.

Goals defined by results desired from the human machine interaction are examined and specific tasks are devised that if performed will achieve the desired goals. Multiple tasks are defined and scheduled including actions taken by the human actors and the machine assistants that will execute the tasks according to the scheduled to meet the production goals. Information relating the tasks and schedule are provided by the task and path planner 203 to the interaction reasoner 207.

Using the presence information and the task and path planning information in coordination with information characterizing the environmental factors of the workspace, the interaction reasoner 207 can identify a current state of the automated machine. For example, the interaction reasoner 207 can determine a current position of the machine from information generated by the cyber-physical low-level controller 201, which provides information relating to the spatial position of the machine in the workspace as well as the position and current state of any implements of the machine, such as robotic arms and tools associated with a given robotic arm.

Additionally, the interaction reasoner 207 can determine the current intention of the machine by looking at the machine's current state and looking at the task and path planner 203 to determine what the machine must do at the present time to approach the machine's next scheduled task. By way of one non-limiting example, a human worker may perform a production task to an intermediate product. In a next production step, the machine receives the product from the human counterpart and is tasked with picking up the product, transporting and positioning the product for a subsequent processing step. With the knowledge of the machine's next task, the interaction reasoner 207 can generate an interaction image 211 to inform the human participant as to the present expectation of the machine. In the example, above, the next action may be for the machine to pick up the product that was just processed by the human. According to an embodiment, the interaction reasoner 207 may provide a visually perceptible image, such as a light projection that illuminates a region of the workspace to indicate to the human the exact spot that the machine expects to pick up the object. With this information, the human can determine the expectation of the machine and place the processed object at the location indicated by the interaction image 211. This allows for increased cooperation between the human and machine participants as well as providing the psychological benefits of informing the human of the machine's intention and thereby manage the expectations of the human as to the actions being taken by the machine. This may provide an additional sense of safety for the human participant. Interaction reasoner 207 provides a perceptible image 215 that provides information to a human participant with regard to the actions of a machine in a human-machine interaction.

An interaction image 211 defines the machine-to-human information to be conveyed (projected in one or more output domains) that circumscribes the immediate human-machine interaction considerations (e.g., safety zones, hazards, task guidance, warnings). A foreshadowing image defines the machine-to-human information to be conveyed (projected in one or more output domains) that circumscribes near-future interaction considerations (e.g., safety zone, hazards, task guidance, warnings)

An image projector 213 translates output images 209 into domain specific projections 215, for example projection domains may include audio, visual and/or haptic. The image projector is responsible for providing contrast between the projected interaction image 215$i$ and projected foreshadowing images. 215$f$.

The goal of enhancing safe HRI by incorporating robot feedback to a human participant is to enable the bidirectional communication via visual (light projection techniques, augmented reality), sound and/or vibration (voice), touch (tactile, heat), or haptics. In one embodiment shown in FIG. 2, light projection is used. An interaction image 215$i$ is projected to a space that is visually perceptible to the human participant. The projected interaction image 215$i$ indicates to the human participant the immediate action of the robot. That is, projected interaction image 215$i$ may indicate to the human participant, a restrictive zone that is representative of the freedom of motion of the robot so that the human may avoid those areas. A projected foreshadowing image 215$f$ is projected alongside of the projected interaction image 215$i$ to represent a future intention of the robot to indicate an area the robot intends to occupy in the near future. As the projected interaction image 215$i$ and the projected foreshadowing image 215$f$ are displayed simultaneously alongside one another, the projected interaction image 215$i$ possesses characteristics that differentiate the projected interaction image 215$i$ from the projected foreshadowing image 215$f$. Any type of differentiating characteristic may be used. For example, the projected interaction image 215$i$ may be a higher intensity light than the projected foreshadowing image 215$f$. In another embodiment, the projected interaction image 215$i$ may be a different color light than the projected foreshadowing image 215$f$. Other differentiating characteristics will be apparent to those of skill and may include flashing, pulsing, alternating colors and the like. As shown in FIG. 2, there may be more than one foreshadowing image 215f where a first foreshadowing image indicates an action of the robot that will occur before a second action that is represented by a second foreshadowing image 215f. As discussed above, the first projected foreshadowing image possesses characteristics so that the first projected foreshadowing image is distinguishable from the second projected foreshadowing image. According to some embodiments, the factory may include multiple robots working alongside with a human companion where a light projection creates a heat map around the vicinity of one of the robots involved in an interaction with the human companion. In some embodiments, the remaining schedule and list of tasks are projected and displayed to the human via a mixed-reality goggle worn by the human.

Figure 3:
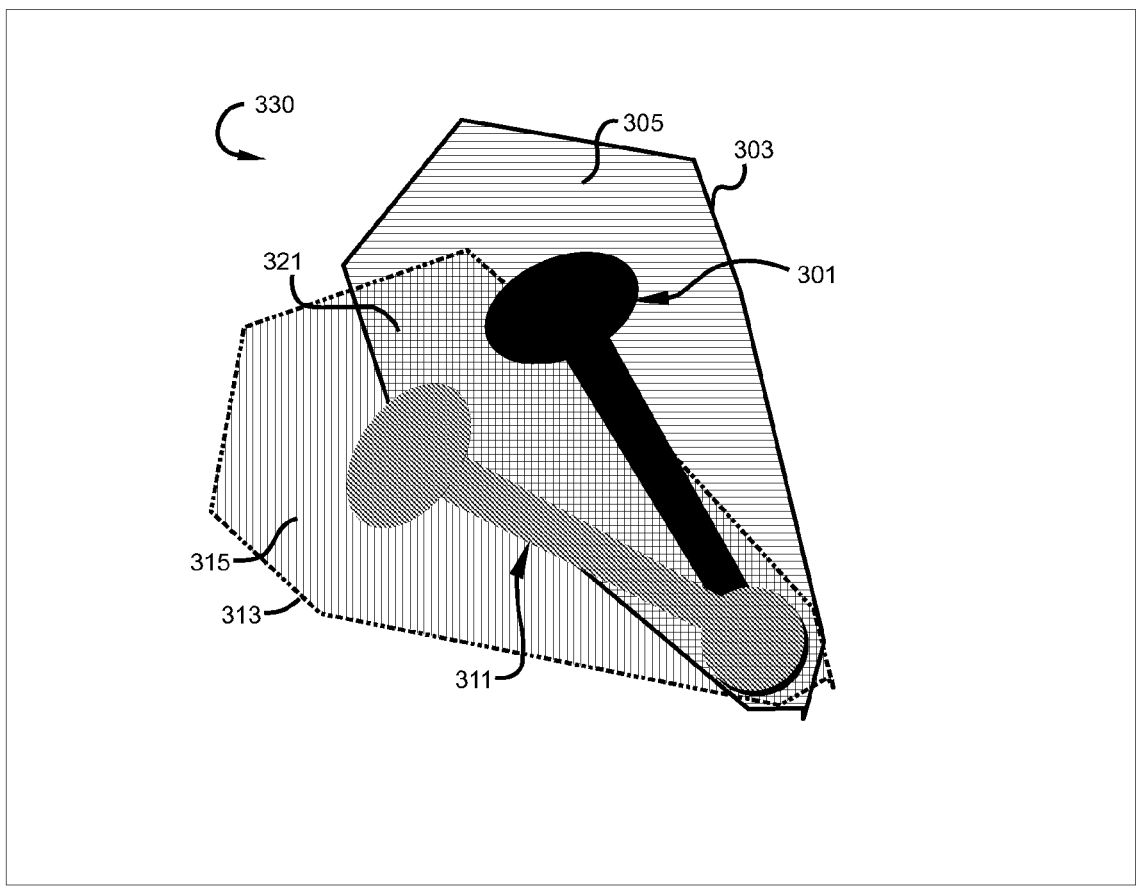
FIG. 3 is an illustration of an interaction image and foreshadow image of an autonomous machine according to aspects of embodiments of the present disclosure.

FIG. 3 shows a projected image in the visual domain that illustrates the function of the projector in providing contrast between an interaction image 305 and a foreshadow image 315. Element 301 represents the interaction position of the production machine. Element 303 represents the boundary between the interaction space 305 and element 330 the non-interaction space. Element 311 represents the foreshadowed position of the production machine. Element 313 represents the boundary between the foreshadowed interaction space 315 and the non-interaction space 330. Element 315 represents the foreshadowed interaction space. Element 321 represents the interaction space that is common to both the interaction image and the foreshadow image.

Figure 4:
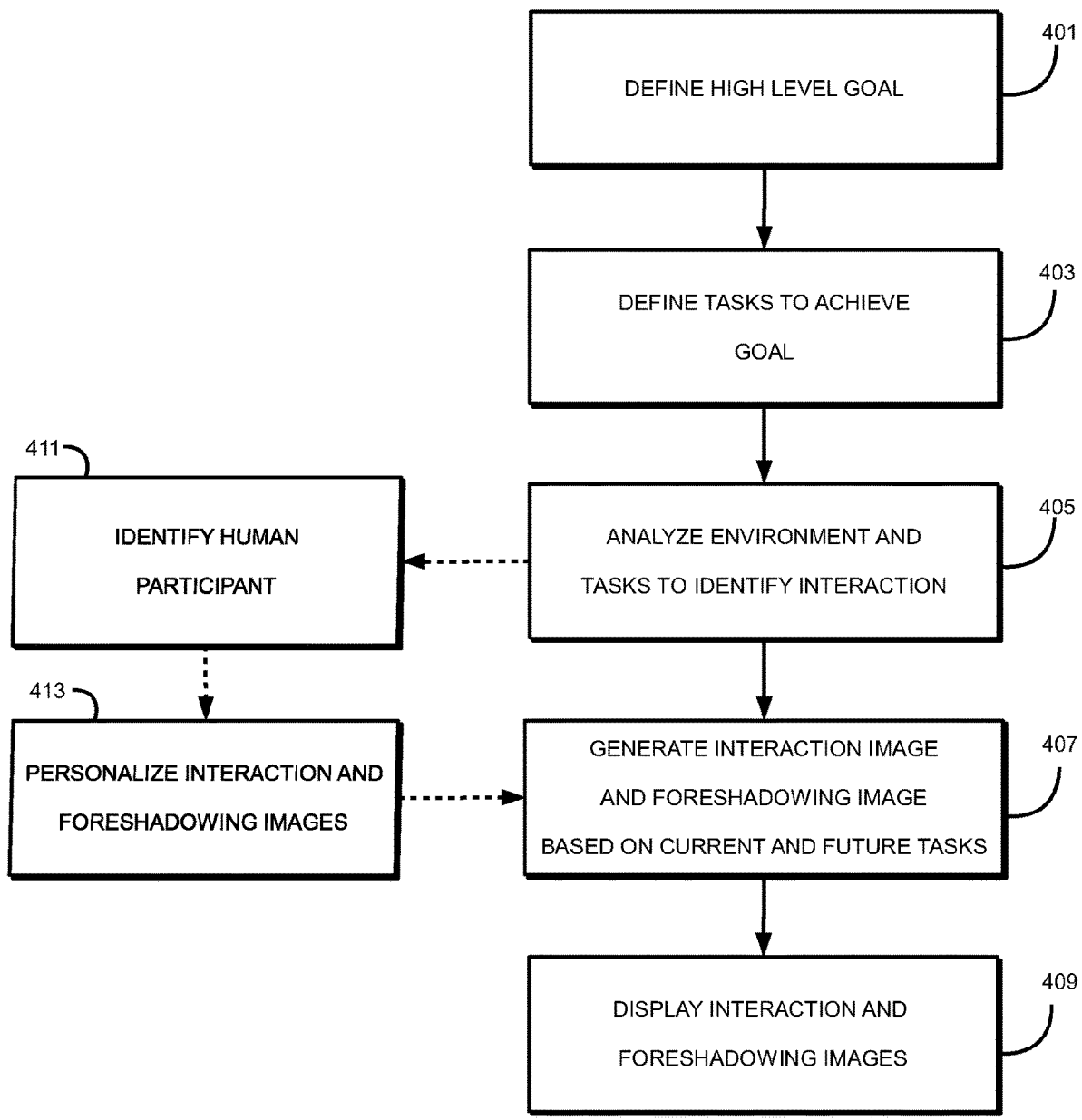
FIG. 4 is a process flow diagram of a method for bi-directional communication in a human-machine interaction according to aspects of embodiments of this disclosure.

FIG. 4. depicts a process flow of a method for providing communication in a machine-human interaction according to aspects of embodiments described in this disclosure. A high-level goal is determined 401 as the desired result of the machine-human interaction. In order to achieve the goal, a number of tasks are defined 403. The defined tasks may be performed by the human and/or machine participants and may be ordered to result in a desired outcome. Sensors in the environment provide state information for objects and environmental factors that when combined with the scheduled task, allow in interaction to be identified 405 where the machine and the human will be operating in the same or close proximity. An interaction reasoner identifies the interaction and generates one or more interaction images and/or foreshadowing images 407 to communicate the expected machine-human interaction. The interaction images and the foreshadowing images are displayed or otherwise related to the human participate to indicate a current or upcoming action of the machine 409.

According to some embodiments, analyzing the environment 405 may include identification of a human participant 411. For example, the human participant may login to a human-machine interface thereby identifying the human as the operator for a given task. Other sensors may be used that may identify the human participant, including voice recognition, image analysis (e.g. facial recognition) or other biometric characteristics. This list is not meant to be limiting and other techniques and methods for automatically detecting and identifying a human participant may be contemplated. On a condition that the human participant is identified 413, the interaction image and foreshadowing images may be personalized to the identified human participant 413. For example, if an identified human participant was identified as being unable to see certain colors, then the interaction and foreshadowing images may be generated using colors that the user is able to see. Other characteristics may be identified as well. For example, the skill level of the identified human participant may determine the timing and intensity or size of a foreshadowing image. Where a more experienced human participant may be more familiar with the typical operation of the machine, a less experienced human participant may be assisted in becoming familiar with operating alongside the machine, by making the foreshadowing images more conspicuous or obvious.

Embodiments described herein rely on a combination of safe HRI methods including low-level control, planning and prediction, motion, as well as psychological aspects. Importantly, the aim of enabling bidirectional communication between the human and robot interactions is utilized to ensure safety while facilitating team fluency.

Embodiments described herein provide the ability to deliver dynamic high-resolution location and task specific warnings when encountering spatially irregular and dynamically altering hazard areas. This represents a marked improvement over conventional means that rely on unidirectional communication flowing from the human to the machine. These embodiments are also novel in their ability to both consider and convey multi-model spatio-temporal activities. Additionally, these embodiments are novel in their ability to foreshadow intent and convey [e.g., hazardous] situations prior to their actual existence which ensures the anticipation of the action by the human teammate.

There has been much attention placed on anticipation of the human's action and the utilization of avoidance through planning aspects. Conventional techniques rely on the detection of a human presence to produce an action in the machine. For example, the detection of a human may produce a control signal to alter the operation of the machine. Actions such as pausing operation, reducing the speed of operation or constraining the range of motion of the machine Accordingly, prior solutions have not addressed communication aspects from the machine to the human and their complementary effect within varying medium (spatially irregular) and temporal activities. That is, the ability to inform the human of intended machine actions in real-time particularly in situations where the machine is autonomous and performing actions without input from the human participant.

According to embodiments of this disclosure, a system with a multiplicity of non-overlapping projectors are configured to impart distinct interaction images. In other embodiments selected portions (views) of a larger interaction image may be provided via a plurality of projectors. According to embodiments, multiple overlapping projectors may be configured to align multiple projections to limit confusion. For example, different projections may be associated with a color specific to a corresponding projection. This will limit confusion by allowing a person working with the machine to distinguish between different overlapping projections.

In some embodiments, a projector may convey multiple distinct image information by encoding multiple image within a single output domain, such as temporal, frequency or spatial domains. For example, in a temporal output domain, multiple warnings may be displayed by a projector by time-based cycling of colors for each warning. In other embodiments, a change in warnings could be indicated by displaying a unique color reserved for signaling a transition between warning projections.

A system where cycle boundaries are defined by a unique sequence of chroma values. According to an embodiment a human proximity detector may be used to enable a person-specific warning. For example, a human proximity detection sensor associated with an autonomous machine, may detect a specific human within a given proximity. The sensor communicates the presence, and in some embodiments, the identity of the nearby human. In response to the notification of the human presence, or alternatively to the identity of the nearby human, the interaction reasoner will generate an interaction image and foreshadowing image that is specific to the detected human. The projected interaction image may be customized based on the human's identity. For example, the area covered by the interaction image may be increased or reduced depending on the skill level associated with the identified human. Alternatively, other characteristics, such as sound, color or haptic features may be enhanced or customized for a particular identified human participant.

In other embodiments, the interaction images may be generated to contain embedded encodings that are detectable by an output detector. For example, a programmable output detector may be constructed that includes the ability to detect and to interpret encodings within an interaction image and/or a foreshadowing image. The image may be encoded with a symbolic presence in the image or could be encoded using a sequence or transition that is detectable by the output detector. In an embodiment, the programmable output detector is in communication with a computer network. The programmable output detector may be configured to communicate with other network components. For example, the programmable output detector may be configured to generate messages and transmit the generated messages over the computer network to other components of the computer network.

In some embodiments, a human participant may utilize a wearable device. The wearable device is configured to provide a notification to the wearer. For example, the wearable device may include an audio output or a vibration mechanism for alerting the wearer to an incoming notification. The incoming notification may include a programmable output of a programmable output detector. The programmable output detector generates and transmits a message as a notification to the wearable device. The wearable device receives the message and presents it to the wearer as a notification. In this way, the wearer receives the message received from the programmable output detector. The message may be based on an interaction image or a foreshadowing image relating to the co-operation of an autonomous machine with the wearer of the wearable device. The notification is not limited to notifications that are indicative of operational warnings. In addition, the notifications may include cooperative intent of the machine relating to a human interaction. For example, the machine may indicate an intention to receive an intermediate product from the human, such as a robot receiving the part for transport to another processing location. The robot may produce an interaction image indicating a precise location the robot expects the human to place the intermediate product. The interaction image may be detected by the programmable output detector and an appropriate message generated. The message is transmitted to the user through a wearable device or other communication device to inform the human of the robot's intention.

Various embodiments may employ multiple techniques for relaying information via interaction images and foreshadowing images. For instance, both the interaction image and the foreshadowing image information may be projected in a manner that signifies temporal interaction and/or foreshadowing information. As a non-limiting example, an interaction or foreshadowing image may be created in an illuminative output domain wherein foreshadowing contrast is utilized to convey near-future interaction information. The temporal relationships between portions of the image may be ranged from strong-to-weak intensity in correspondence to time in which the portion of the image will become relevant as a present interaction. In some embodiments, an uncertainty factory may be indicated by example, by displaying the foreshadowing image as a diminishing shadow.

An executable application, as used herein, comprises code or machine-readable instructions for conditioning the processor to implement predetermined functions, such as those of an operating system, a context data acquisition system or other information processing system, for example, in response to user command or input. An executable procedure is a segment of code or machine-readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof.

What is claimed is:

1. A system for improving safety in an interaction between a human and an industrial machine comprising:
   a cyber-mechanical system including at least one industrial machine;
   a cyber-mechanical control system for processing inputs to produce control outputs for the at least one industrial machine;
   a task planner configured to translate high level goals into scheduled tasks for the at least one industrial machine;
   a perception module configured to receive information relating to at least one industrial machine, the information associated with the goals and the tasks required to complete the goals within an environment, wherein the environment includes one or more humans;

an interaction reasoner configured to:
    receive inputs concerning the one or more humans, the goals, and the tasks required to complete the goals;
    process the received inputs to consider context of interactions that occur between each of the at least one industrial machines with respect to the one or more humans; and
    identify at least one interaction between the at least one industrial machine and a human working in cooperation with the at least one industrial machine to accomplish the goals;

an image generator configured to:
    produce an interaction image that defines machine-to-human information to be conveyed that circumscribes immediate human-machine considerations; and
    produce a foreshadowing image that defines machine-to-human information to be conveyed that circumscribes near-future interaction considerations; and an image projector associated with each of the at least one industrial machines, the image projector configured to project the interaction image and foreshadowing image so as define a contrast between the projected interaction image and the projected foreshadowing.

2. The system of claim 1, wherein the interaction image is an embodiment of information relating to a human-machine interaction in one of a plurality of domains.

3. The system of claim 2, wherein the domain for the interaction image is visual.

4. The system of claim 2, wherein the domain for the interaction image is audible.

5. The system of claim 2, wherein the domain for the interaction image is human touch.

6. The system of claim 2, wherein the domain for the interaction image is temperature related.

7. The system of claim 2, wherein the domain for the interaction image is haptic.

8. The system of claim 2, wherein the interaction image contains encoded information relating to the information of the human-machine interaction.

9. The system of claim 8, further comprising a programmable output detector configured to detect the interaction image and decode the encoded information.

10. The system of claim 9, wherein the programmable output detector is configured to generate a message based on the decoded information.

11. The system of claim 10, wherein the programmable output detector is configured to transmit the generated message on a computer network.

* * * * *